(12) United States Patent
Meunier (10) Patent No.: US 9,963,369 B2
(45) Date of Patent: May 8, 2018

(54) PORTABLE POWER GENERATION AND PRESSURIZED WATER FILTRATION UNIT

(71) Applicant: Steven J. Meunier, Las Vegas, NV (US)

(72) Inventor: Steven J. Meunier, Las Vegas, NV (US)

(73) Assignee: Steven J. Meunier, Las Vegas, NV (US)

( * ) Notice: Subject to any disclaimer, the term of this patent is extended or adjusted under 35 U.S.C. 154(b) by 421 days.

(21) Appl. No.: 14/147,249

(22) Filed: Jan. 3, 2014

(65) Prior Publication Data
US 2014/0183107 A1 Jul. 3, 2014

Related U.S. Application Data

(60) Provisional application No. 61/748,696, filed on Jan. 3, 2013.

(51) Int. Cl.
| | | |
|---|---|---|
| C02F 9/00 | (2006.01) | |
| H01L 31/042 | (2014.01) | |
| C02F 1/32 | (2006.01) | |
| C02F 1/66 | (2006.01) | |
| H02S 10/40 | (2014.01) | |
| C02F 1/28 | (2006.01) | |
| C02F 1/44 | (2006.01) | |

(52) U.S. Cl.
CPC ............ C02F 9/005 (2013.01); H01L 31/042 (2013.01); H02S 10/40 (2014.12); *C02F 1/283* (2013.01); *C02F 1/325* (2013.01); *C02F 1/441* (2013.01); *C02F 1/444* (2013.01); *C02F 1/66* (2013.01); *C02F 2201/009* (2013.01); *Y02A 20/212* (2018.01); *Y02W 10/37* (2015.05)

(58) Field of Classification Search
CPC .......... C02F 1/283; C02F 1/325; C02F 1/441; C02F 1/444; C02F 1/66; C02F 1/32; C02F 1/44; C02F 1/28; C02F 2201/009; C02F 9/005; C02F 9/00
USPC .................................. 210/90, 203, 202, 900
See application file for complete search history.

(56) References Cited

U.S. PATENT DOCUMENTS

| | | | | |
|---|---|---|---|---|
| 5,004,535 A | * | 4/1991 | Bosko | B01D 61/10 210/257.2 |
| 6,557,570 B1 | * | 5/2003 | Gierbolini | B08B 9/0325 134/111 |
| 6,863,827 B2 | * | 3/2005 | Saraceno | C02F 9/005 210/241 |

(Continued)

*Primary Examiner* — Robert Clemente
*Assistant Examiner* — Akash Varma (57) ABSTRACT

A portable power generation and water filtration unit includes a first pump system, a second pump system, a power system, and an enclosure for housing and support. The first pump system consists of an inlet, outlet, and pump unit that is capable of connecting and pumping water from a source to a destination such as a plumbing fixture. The second pump system also includes a filter system, reverse osmosis treatment unit, and alkaline treatment unit. In addition to pumping water, the second pump is used to create sanitized water which is safe and healthful for human use and consumption. In order to supply the necessary electricity for the pump systems, a solar panels and convert sunlight to energy for storage in batteries. The batteries are then electrically connected to pumps and other electrical components, allowing the apparatus to be used off the electrical grid.

16 Claims, 10 Drawing Sheets

(56) References Cited

U.S. PATENT DOCUMENTS

2004/0104153 A1* 6/2004 Yang ................... B01D 61/022
                                                          210/136
2007/0199875 A1* 8/2007 Moorey ............... B01D 61/147
                                                          210/206

* cited by examiner

PORTABLE POWER GENERATION AND PRESSURIZED WATER FILTRATION UNIT

The current application claims a priority to the U.S. Provisional Patent application Ser. No. 61/748,696 filed on Jan. 3, 2013.

FIELD OF THE INVENTION

The present invention relates generally to a portable apparatus provided for the generation of electricity, the pumping of water, and the treatment of water.

BACKGROUND OF THE INVENTION

Whether for use during travel and camping, or emergency use during disasters, portable units for the provision of basic utilities are well known. A number of products have been created to address the need for electricity, clean water, or running water when they would otherwise be unavailable. These existing products generally implement some sort of battery powered system, a number of filters, and sometimes ultraviolet lamps and self contained motors for pressuring the system. While these existing products are useful, many have found that a single system in incapable of providing all desired functions. For example, separate systems may need to be acquired in order to provide power and to filter water. There exists a need for a portable power generation and water filtration unit that can serve as an all-in-one solution for remote travel and emergency situations.

It is therefore an object of the present invention to provide a system with a first pump system purely for pressuring and pumping water, a second pump system for both pumping and sanitizing water, and a power system for supply energy necessary to operation. It is a further object of the present invention to provide two pump systems to allow multiple outlets to be used simultaneously. It is also an object of the present invention to provide the option of further treating sanitized water through reverse osmosis or alkaline enhancement.

The present invention is additionally provided as a portable solution to utility needs in off-grid locations or anywhere there is a need for basic utilities. The present invention makes available water for general use and human consumption, as well as an independent power system for operation when grid power is unavailable (such as due to physical separation between the present invention and the grid or a failure in the grid). Thus, the present invention can be connected to dwellings in order to provide running water for use in showers, toilets, sinks, and any other device which may require running water. Similarly, the present invention acts as a power source for operating televisions, refrigerators, computers, lighting, and similar electrical devices. Thus, even in remote locations, such as a lakeside cabin, running water and electricity can be provided. Even in urban locations with regular access to water and electricity, the present invention can be used to supply basic utilities in the event of a natural disaster or other event that results in failure of the local power and water systems.

The whole of the present invention improves upon the prior art as it not only provides the ability to pump and pressurize water as well as the ability to supply electricity. While there are a number of existing existing solar generators, and even a few solar powered water purification units, the combination of a solar generator, water purification system, and the ability to pressurize water for supply to remote plumbing is heretofore unseen. The ability to use a single and portable unit for electricity, water purification, and plumbing is a great advancement. This novelty is enhanced by the ability to treat water through reverse osmosis as well as produce alkaline water, the latter of which is currently not provided for in available systems. Due to the capabilities of the present invention it is desirable for use across the world, whether in remote locations without access to utilities, areas where external circumstances have disabled the local utility systems, and third world countries that don't have developed infrastructure for water pumping, pressurization, purification, and electrical transmission.

DETAIL DESCRIPTIONS OF THE INVENTION

All illustrations of the drawings are for the purpose of describing selected versions of the present invention and are not intended to limit the scope of the present invention.

The present invention is a portable power generation and water filtration unit that addresses a number of needs for in areas without access to functioning utilities. More specifically the present invention is capable of providing power, pressurizing water, and purifying water. To support these capabilities, the present invention comprises a first pump system 1, a second pump system 2, and a power system 3, along with an enclosure 4 for securing and protecting the integral components of the present invention. The first pump system 1 and second pump system 2 provide the capability to move water from a source to an area in need, and even to sanitize the water (specific to the second pump system 2) for human consumption and related use. The power system 3 provides the necessary electricity to operate the first pump system 1 and second system, as well as any electric devices which a user might power via the present invention. Though the present invention is described as being provided for water, ultimately the present invention can be used to pump any type of fluids and its use is not restricted to water.

Figure 1:
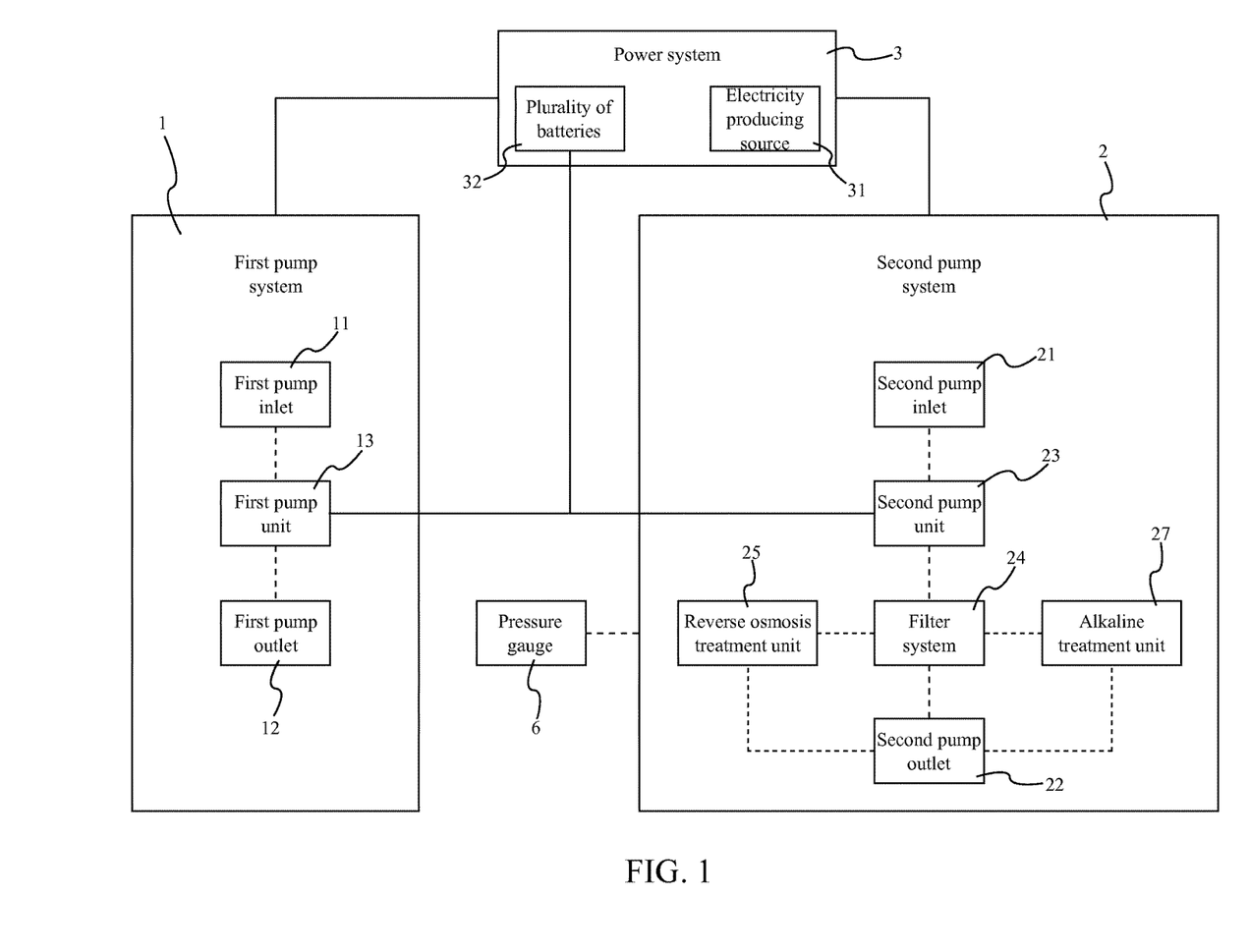
FIG. 1 is a diagram of the primary systems, electrical connections, and fluid relations of the present invention.

The first pump system 1, outlined in part of FIG. 1, is provided solely for the purpose of moving water between two locations. For example, the first pump system 1 could be used to pump water from a reservoir of collected water to a device that requires water, such as a toilet. This is just one example of how the present invention is useful to those who live in, travel in, or vacation in areas that have limited or even no access to running water and electricity. To this end, the first pump system 1 comprises a first pump inlet 11, a first pump outlet 12, and a first pump unit 13. The first pump inlet 11 allows a source of water to be fed (preferably by gravity or another method which does not strain the first pump unit 13) to the first pump system 1. The first pump unit 13 works to move water from the first pump inlet 11 to the first pump outlet 12, creating fluid communication between the first pump inlet 11 and the first pump outlet 12. The first pump outlet 12 can then be connected to another device, such as the aforementioned toilet, thus providing pressurized water as needed.

Similar to the first pump system 1 is the second pump system 2, which adds the capability of filtering water in addition to pumping water. Corresponding to the first pump system 1, the second pump system 2 comprises a second pump inlet 21, a second pump outlet 22, and a second pump unit 23. The second pump system 2 further comprises a filter system 24, a reverse osmosis treatment unit 25, and an alkaline treatment unit 27, all of which are specific to the second pump system 2 and are shown in FIG. 1. The second pump inlet 21, second pump outlet 22, and second pump unit 23 mirror their corresponding components of the first pump system 1, such that the second pump inlet 21 is in fluid communication with the second pump outlet 22 through the second pump unit 23.

The filter system 24, reverse osmosis treatment unit 25, and alkaline treatment unit 27 are provided for sanitization of water generated by the present invention, making it suitable and more healthful for human consumption. This allows the second pump system 2 to be used when water quality is important, with the first pump system 1 being used when the water is not for human consumption. The provision of two separate pump systems, only one of which can sanitize water, is beneficial as the filter system 24, reverse osmosis treatment unit 25, and alkaline treatment unit 27 are not used unnecessarily, which helps extend their lifespan and reduce maintenance costs associated with the present invention.

In order to operate the first pump system 1 and the second pump system 2, as well as power any connected devices, the power system 3 is provided. The power system 3 comprises at least one solar panels 31 and a plurality of batteries 32. The solar panels 31 (potentially more can be provided or added) is used to generate energy from sunlight, which can then be stored for future use in the batteries 32., with the preferred embodiment using 12-volt batteries 32. This allows the power system 3 to be electrically connected to both the first pump system 1 and the second pump system 2, providing electricity for operation of the each pump system and their electrically operate subcomponents. These electrical connections, in addition to fluid connections, are shown in FIG. 1.

Figure 2:
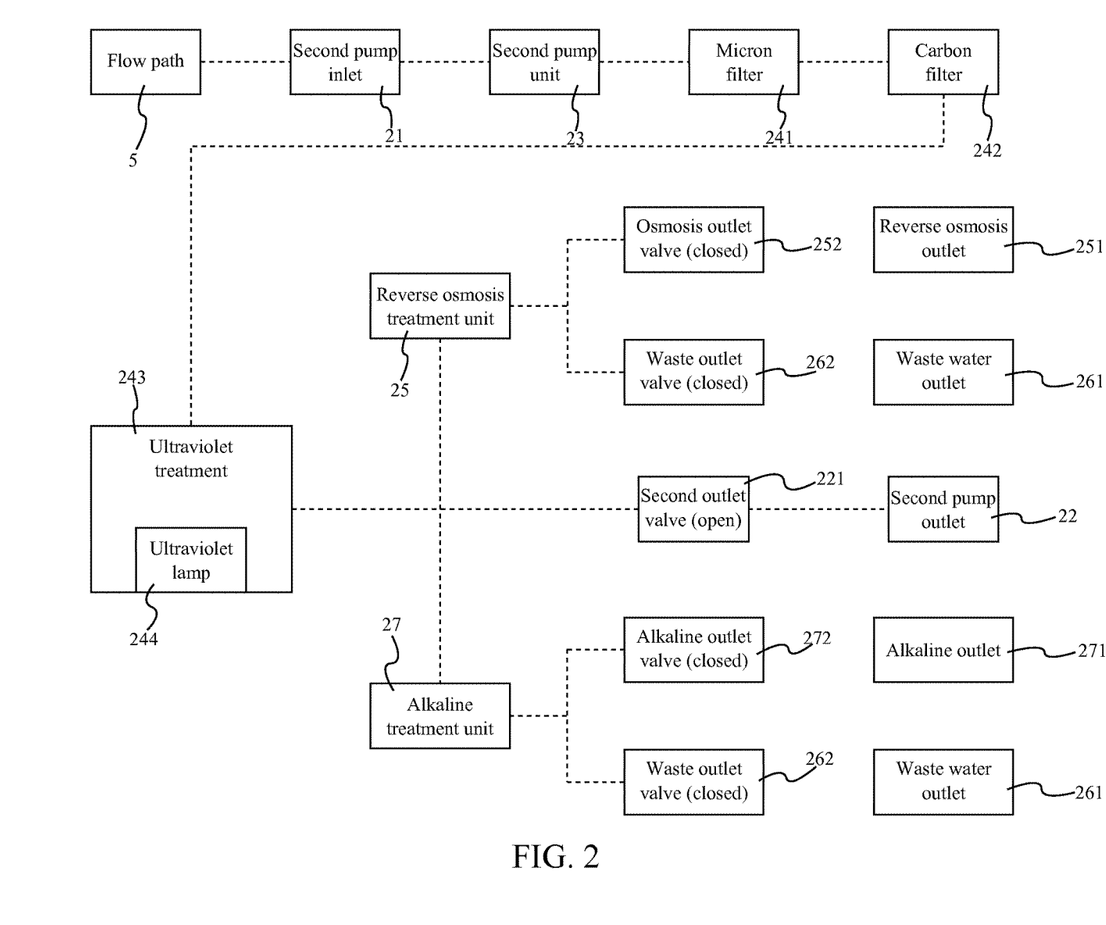
FIG. 2 is a diagram showing one configuration for the second pump system of the present invention.
Figure 3:
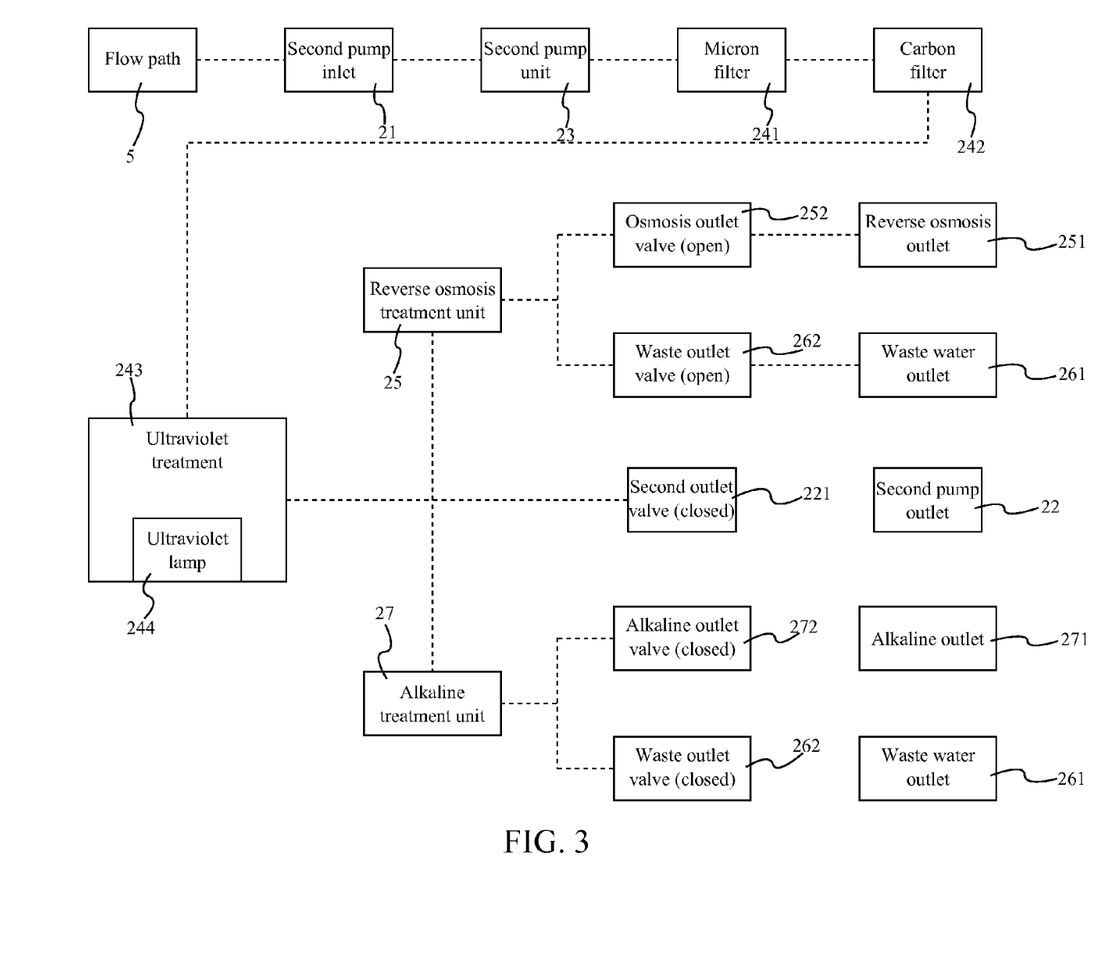
FIG. 3 is a diagram showing a second configuration for the second pump system of the present invention.
Figure 4:
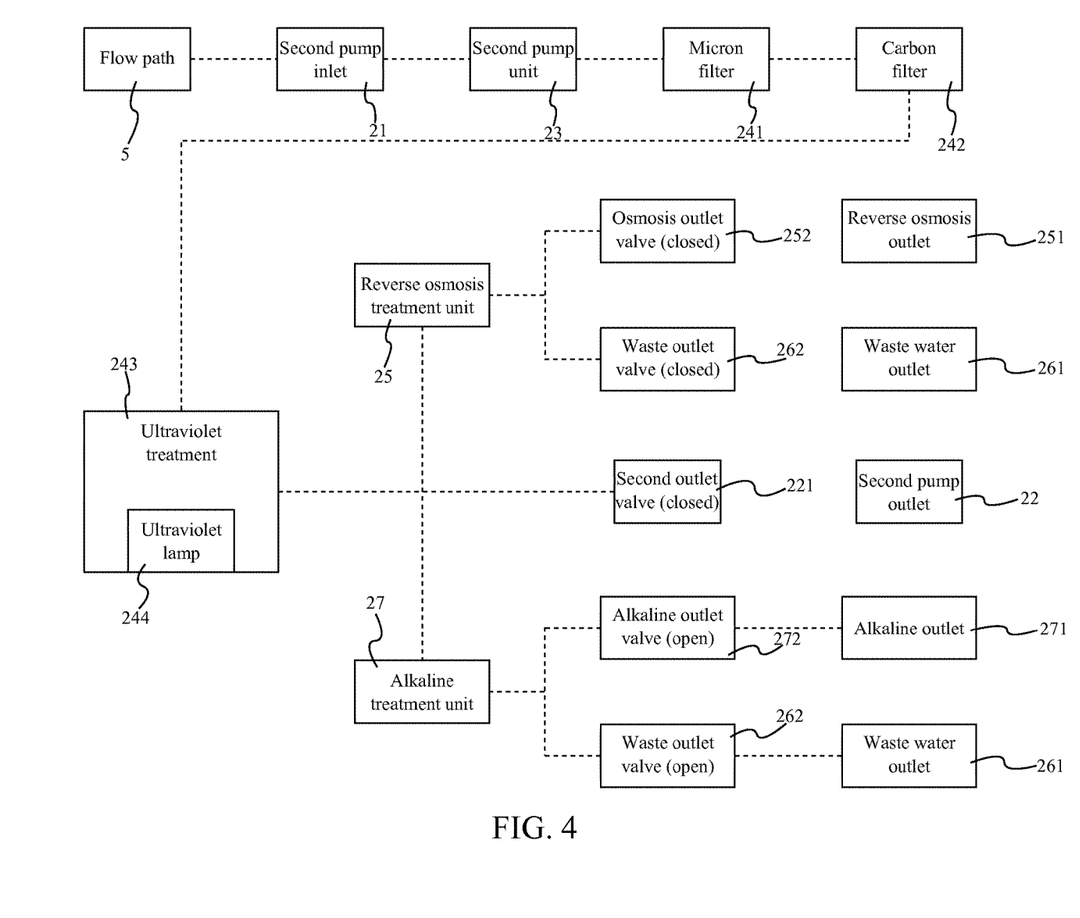
FIG. 4 is a diagram showing a third configuration for the second pump system of the present invention.
Figure 6:
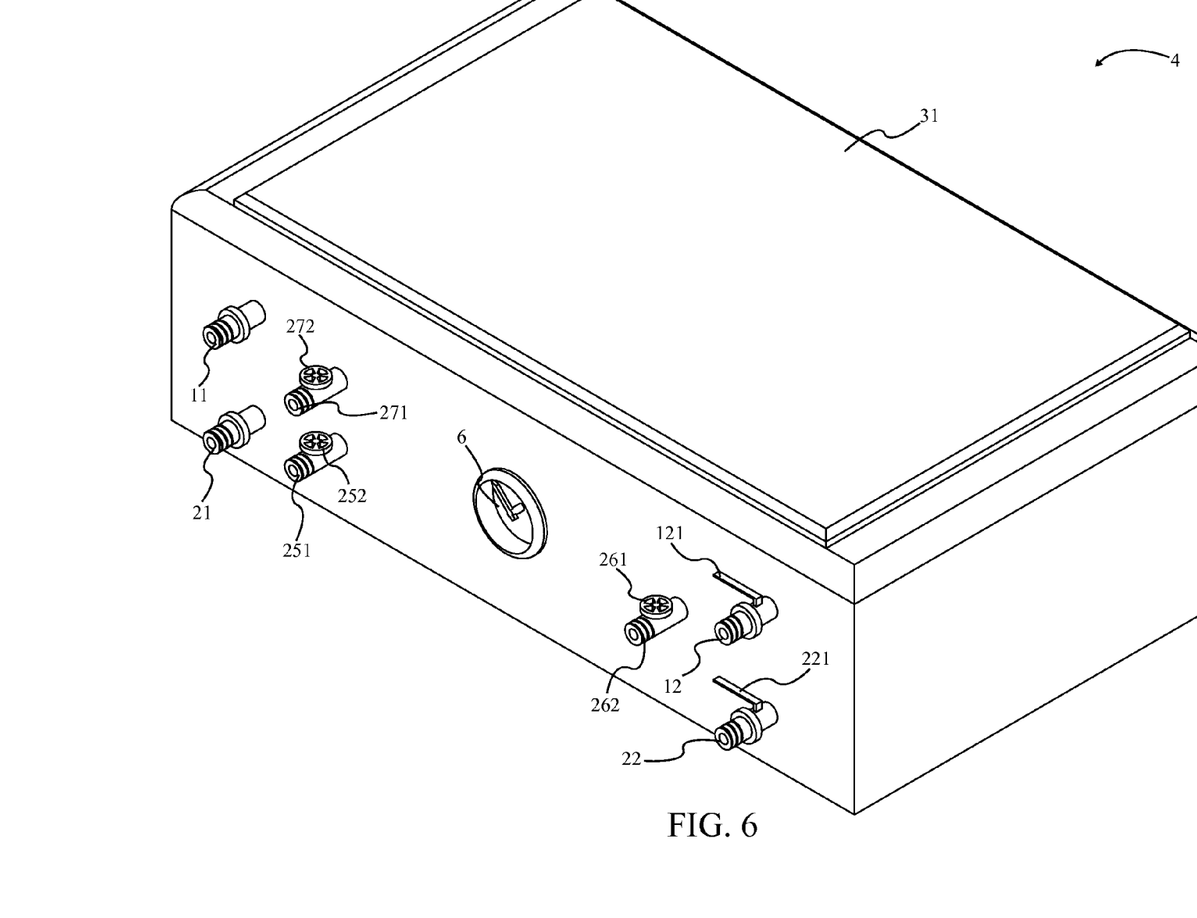
FIG. 6 is a front perspective view showing an example enclosure for the present invention.
Figure 7:
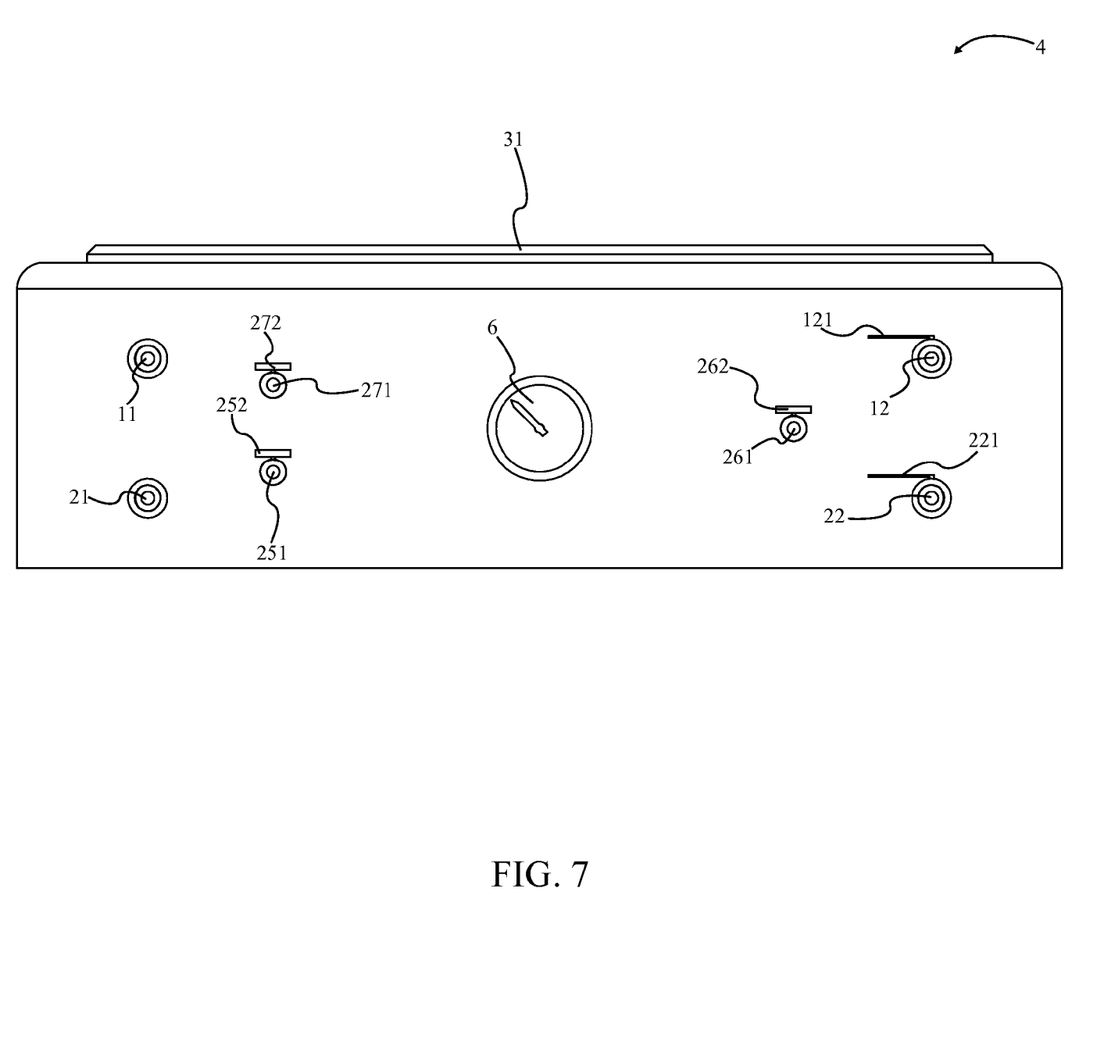
FIG. 7 is a front view showing an example enclosure for the present invention.

To provide a user with control over the flow rate of the first pump system 1 and the second pump system 2, the first pump outlet 12 comprises a first outlet valve 121 while the second pump outlet 22 comprises a second outlet valve 221. The first outlet valve 121 is variably connected to the first pump outlet 12, such that a user can gradually open or close the valve (between a fully open position and a fully closed position) to increase or decrease the flow of water from the first pump outlet 12. Similarly, the second outlet valve 221 is variably connected to the second pump outlet 22, allowing a user to open and close the second outlet valve 221 to control the flow rate of the second pump outlet 22. The provision of the first outlet valve 121 and the second outlet valve 221 thus provides a measure of flow control to a user, as well as providing an easy method of enabling or disabling water flow out of the first pump outlet 12 and second pump outlet 22. These outlet valves are represented in FIG. 2-FIG. 4, and are additionally illustrated in FIG. 6, FIG. 7, and FIG. 10.

In order allow a user access to the first pump inlet 11 and first pump outlet 12, they are externally mounted to the enclosure 4 of the present invention. Likewise, the second pump inlet 21 and second pump outlet 22 are externally mounted to the enclosure 4. This allows a user to perform hookups to the first pump system 1 and second pump system 2, such as by coupling short-term or long-term hookups to the inlets and outlets. Since the first pump unit 13 and second pump unit 23 are in fluid communication with their respective inlets and outlets, they do not need to be externally mounted. Instead, the first pump unit 13 and second pump unit 23 are housed and protected within the enclosure 4.

Expanding upon the second pump system 2, the filter system 24 comprises a micron filter 241, a carbon filter 242, and an ultraviolet treatment section 243. These components are sequentially positioned in a flow path 5 between the second pump inlet 21 and the second pump outlet 22. By positioning these filter components in a flow path 5, the latter of which is a dependent upon the second pump inlet 21 and second pump outlet 22 being in fluid communication with each other, water being routed through the second pump system 2 can be sanitized. Since the filter system 2 contains potentially fragile components and does not need to be accessed by a user during regular operation of the present invention, it is housed within the enclosure 4. Due to the positioning of the filter system 24, and water running through the second pump system 2 passes through the micron filter 241, the carbon filter 242, and the ultraviolet treatment section 243, each of which help to sanitize the water by different means. These filter system 24 components are visualized in FIG. 2-FIG. 4.

The micron filter 241 functions to remove fine particles from the sourced water, examples of which include but are not limited to sand, silt, dirt, and even rust. The water of the second pump system 2 passes by this filter first. Positioned after the micro filter is the carbon filter 242. The carbon filter 242, via absorption, removes contaminants and impurities from the water, examples of which include but are not limited to chlorine, sediments, volatile organic compounds, and even tastes and odors. As known in the art, the carbon filter 242 utilizes a bed activated carbon as part of the filtration process. The last step in the filter system 24 is the ultraviolet treatment section 243, which comprises an ultraviolet lamp 244. As water passes through the ultraviolet treatment section 243, is it subject to radiation from the ultraviolet lamp 244 which purifies the water. Preferably, the ultraviolet lamp 244 is centrally positioned within the ultraviolet treatment section 243, such that all the dispersed radiation comes into contact with the water.

Figure 8:
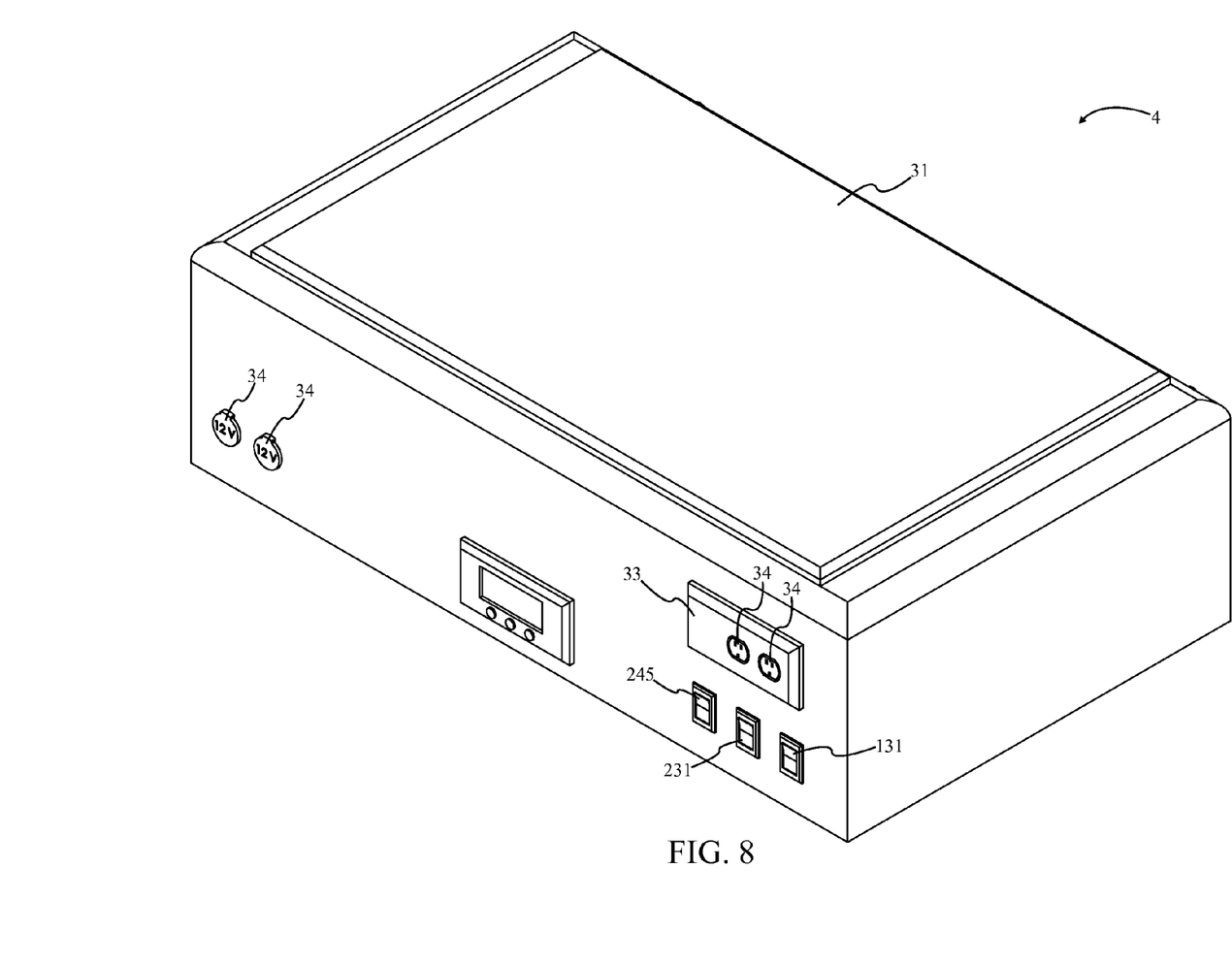
FIG. 8 is a rear perspective view showing an example enclosure for the present invention.
Figure 9:
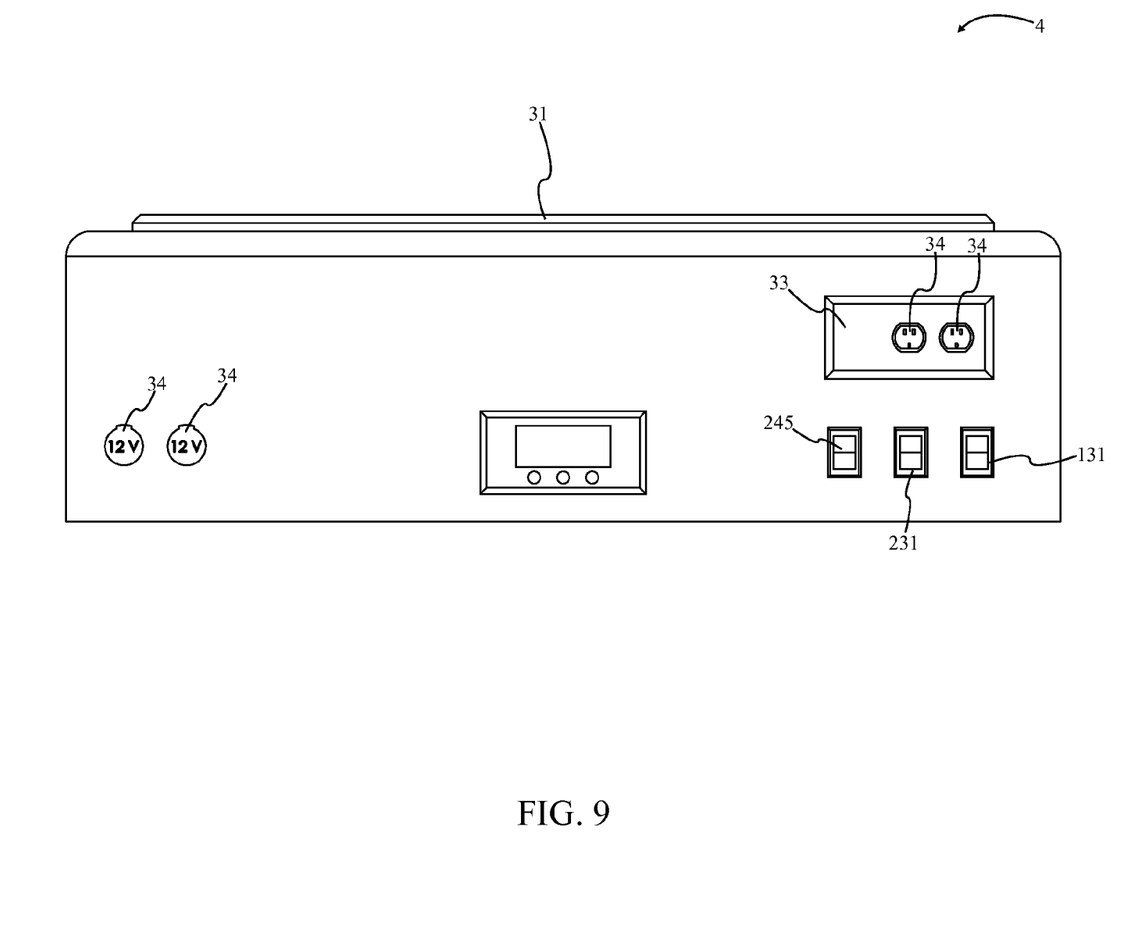
FIG. 9 is a rear view showing an example enclosure for the present invention.

As the first pump unit 13, second pump unit 23, and ultraviolet lamp 244 all require electricity in order to function, they are preferably turned off when not in use. This allows to preserve the energy stored in the batteries 32 and minimize leakage and other unwanted expenditures. Thus, in the preferred embodiment the first pump unit 13 comprises a first power switch 131, the second pump unit 23 comprises a second power switch 231, and the ultraviolet lamp 244 comprises an ultraviolet power switch 245. These serve as electrical switches which can be opened or closed to break or complete electrical connections to the plurality of batteries 32. Resultantly, the first pump unit 13 is electrically connected to the plurality of batteries 32 through the first power switch 131, the second pump unit 23 is electrically connected to the plurality of batteries 32 through the second power switch 231, and the ultraviolet lamp 244 is electrically connected to the plurality of batteries 32 through the ultraviolet power switch 245. This configuration allows a user to easily turn the first pump system 1, second pump system 2, and ultraviolet lamp 244 on or off by simply flipping the corresponding switch. The ability to turn these components off when not in use is beneficial as their effective lifetime is extended due to a reduced amount of use. This is especially beneficial when components can be costly to replace, as can be the case with ultraviolet bulbs. These benefits are in addition to the reduction of energy expenditure achieved by turning systems off when not in use. An electrical representation of the above is provided in FIG. 5, while the physical switches themselves are shown in FIG. 8 and FIG. 9.

In addition to the filter system 24, the present invention includes the ability to further treat or enhance water through reverse osmosis and alkaline treatment. Reverse osmosis is used for further purification of treated water, while the alkaline treatment supplements the water to raise the pH level, resulting in a more healthful liquid for human consumption. Provided as part of the second pump system 2, the reverse osmosis treatment unit 25 comprises a reverse osmosis outlet 251 and a waste water outlet 261. As the reverse osmosis process creates what is commonly referred to as "waste" water, two outlets are necessary for the reverse osmosis treatment unit 25. As water passes through the reverse osmosis treatment unit 25, treated water is dispensed from the reverse osmosis outlet 251 while the waste water is expelled from the waste water outlet 261. Prior to treatment, the water originates from the same source, with both the reverse osmosis outlet 251 and the waste water outlet 261 being in fluid communication with the second pump inlet 21 through the second pump unit 23. Both the reverse osmosis treatment unit 25 and the alkaline treatment unit 27 are positioned in the flow path 5 after the filter system 24, ensuring that any produced reverse osmosis or alkaline water has also been subject to the micron filter 241, carbon filter 242, and ultraviolet lamp 244.

As with the regular outlets, valves are provided for the outlets of the reverse osmosis treatment unit 25. The reverse osmosis treatment unit 25 comprises an osmosis outlet valve 252 and the waste water outlet 261 comprises a waste outlet valve 262. The osmosis outlet valve 252 is variably connected to the reverse osmosis outlet 251, such that actuating the osmosis outlet valve 252 allows for the reverse osmosis outlet 251 to be adjusted between a fully open and fully closed position. Likewise, the waste outlet valve 262 is variably connected to waste water outlet 261 to allow for continuous adjustments between an open and closed position. It is noted that since the reverse osmosis treatment unit 25 produces waste water, both the reverse osmosis outlet 251 and waste water outlet 261 must be unobstructed (e.g. not closed) to allow for proper operation of the reverse osmosis treatment unit 25.

The alkaline treatment unit 27 is similar to the reverse osmosis treatment unit 25 in that it forks source water into two separate outlets. The alkaline treatment unit 27 comprises an alkaline outlet 271 and a waste water outlet 261. In fact, the waste water outlet 261 of the alkaline treatment unit 27 can be shared with the waste water outlet 261 of the reverse osmosis treatment unit 25, such that the present invention only requires one waste water outlet 261. Whether provided separately or shared, the waste water outlet 261 of the alkaline treatment unit 27 also comprises a waste outlet valve 262 which allows the waste water outlet 261 to be opened and closed, including in increments rather than being limited to a binary (e.g. completely open or completely closed) positions, achieved through a variable connection between the waste outlet valve 262 and the waste water outlet 261 itself. The alkaline outlet 271 comprises an alkaline outlet valve 272 which serves the same purpose; by means of a variable connection between the alkaline outlet valve 272 and the alkaline outlet 271 the alkaline outlet 271 can be fully and partially opened and closed as desired by a user. As with the reverse osmosis treatment unit 25, the alkaline treatment unit 27 requires the alkaline valve and waste water valve to both be at least partially open in order to function.

To use route the water in the second pump system 2 through the reverse osmosis treatment unit 25 or the alkaline treatment unit 27, the other outlets must be closed. By only opening the outlets of the reverse osmosis treatment unit 25 or the alkaline treatment unit 27, water pressure in the second pump system 2 builds up and forces the water out through the only open outlets. For example, by closing the alkaline outlet 271 and the second pump outlet 22, the water in the second pump system 2 increases in pressure until it is forced out of the only available open outlets; in this example, those are the reverse osmosis outlet 251 and the waste water outlet 261. Conversely, if the reverse osmosis outlet 251 is closed (but leaving the waste water outlet 261 open), the water is forced to pass through the alkaline treatment unit 27. Examples of opening and closing valves to utilize the different sanitization options are provided in FIG. 2-FIG. 4.

In the above manner the reverse osmosis treatment unit 25 and alkaline treatment unit 27 can be hydraulically engaged, negating the need for additional energy consumption for operation of the reverse osmosis treatment unit 25 and the alkaline treatment unit 27. Instead, simply manipulation of the outlets and their corresponding valves is sufficient to operate these components.

The first pump system 1 and second pump system 2 pressurize water flowing through the present invention, allowing for its use in conjunction with plumbing fixtures such as showers, sinks, and toilets. Being adapted for use with plumbing systems is one of the key elements that makes the present invention an improvement over existing products.

Allowing for the monitoring of the fluid pressure in the first pump system 1 and the second pump system 2 is a pressure gauge 6, as shown in FIG. 1, FIG. 8, and FIG. 9. The pressure gauge 6 is externally mounting to the enclosure 4 such that a user may quickly and visually check water pressure. In order to display the fluid pressure the pressure gauge 6 is in fluid communication with the second pump system 2. The pressure gauge 6 is provided for the measurement of flow through the second pump system 2 and relevant products, such as specialty water pressure (produced by the reverse osmosis treatment unit 25 or the alkaline treatment unit 27), waste water pressure (produced by both the reverse osmosis treatment unit 25 and the alkaline treatment unit 27), and purified water (produced by the filter system 24). In the preferred embodiment the specialty water (as produced by the reverse osmosis treatment unit 25 and alkaline treatment unit 27) is output at a rate of 5 gallons per hour. Conversely, the purified water produced by the filter system 24 is treated much more quickly, output at a rate of 2.5 gallons per minute. In other embodiments the output rates of the specialty waters and purified water can be increased or decreased by using more or less powerful pump systems, with such variations negatively or positively affecting the size, weight, power requirements, and overall cost of the present invention.

As the present invention is unable to completely operate without electricity, the power system 3 remains a necessity. To ensure constant voltage the plurality of batteries 32 are connected to each other in a parallel circuit. The batteries 32 are charged via the solar panels 31. The solar panels 31 can be connected to the batteries 32 through interior connections, or potentially an external connection can be provided for the solar panels 31, beneficial in terms of modularity. For their protection, the plurality of batteries 32 are housed within the enclosure 4. The solar panels 31, however, require sunlight to operate and thus are externally mounted to the enclosure 4.

Potentially, a user can retrofit the present invention with additional solar panels 31, simply electrically connected them to the plurality of batteries 32 via wiring or through supplied quick-connect points. Furthermore, to prevent loss of charge and degradation during indoor usage or storage of the present invention, positive and negative posts are mounted to the enclosure 4 and electrically connected to the batteries 32. These positive and negative terminals enable external electrical connections, ultimately allowing the batteries 32 to maintain their charge in the aforementioned situations. By this means, the present invention can be operated by through a number of power sources, examples of which include but are not limited to alternative sources based upon wind power, hydro power, and even human power as later discussed. Ultimately, any type of power source can be used to charge the batteries 32 and run the present invention via the positive and negative posts. In addition to operating the first pump unit 13, second pump unit 23, and ultraviolet lamp 244, the plurality of batteries 32 can be electrically connected to at least one accessory outlet 34. This accessory outlet 34 allows for accessory electrical devices, such as phones, radios, and even televisions to be powered by the present invention. In order to provide alternating current (AC), as needed for the operation of appliances used in the home, a power inverter 33 is electrically connected between the plurality of batteries 32 and the at least one accessory outlet 34. Preferably, the AC current is produced at 120 volts, as is standard in a number of countries, such as on the North American continent. In other countries, where 230 volts are standard, a variant embodiment can be provided for the generation of 230 AC voltage. Additional accessory outlets 34 can be provided to allow for more devices to be charged or powered by the plurality of batteries 32. In addition to the AC outlets provided via the power inverter 33, direct current (DC) outlets can also be provided as part of the accessory outlets 34. The DC outlets are used to power devices that run directly of DC, such as flashlights, air pumps, and radios. As more devices are connected, it may be necessary to use more batteries 32 in order to supply the required electricity.

In the preferred embodiment a charge controller is provided for use with the solar panel 31 and batteries 32. The charge controller is used to monitor how much charge is currently stored in the batteries 32 in order to prevent overcharging or discharging. It also allows a user to control and adjust the energy supplied from the solar panel 31 to the batteries 32, as well as the energy being dispensed from the batteries 32 to other components and connected accessories.

Figure 5:
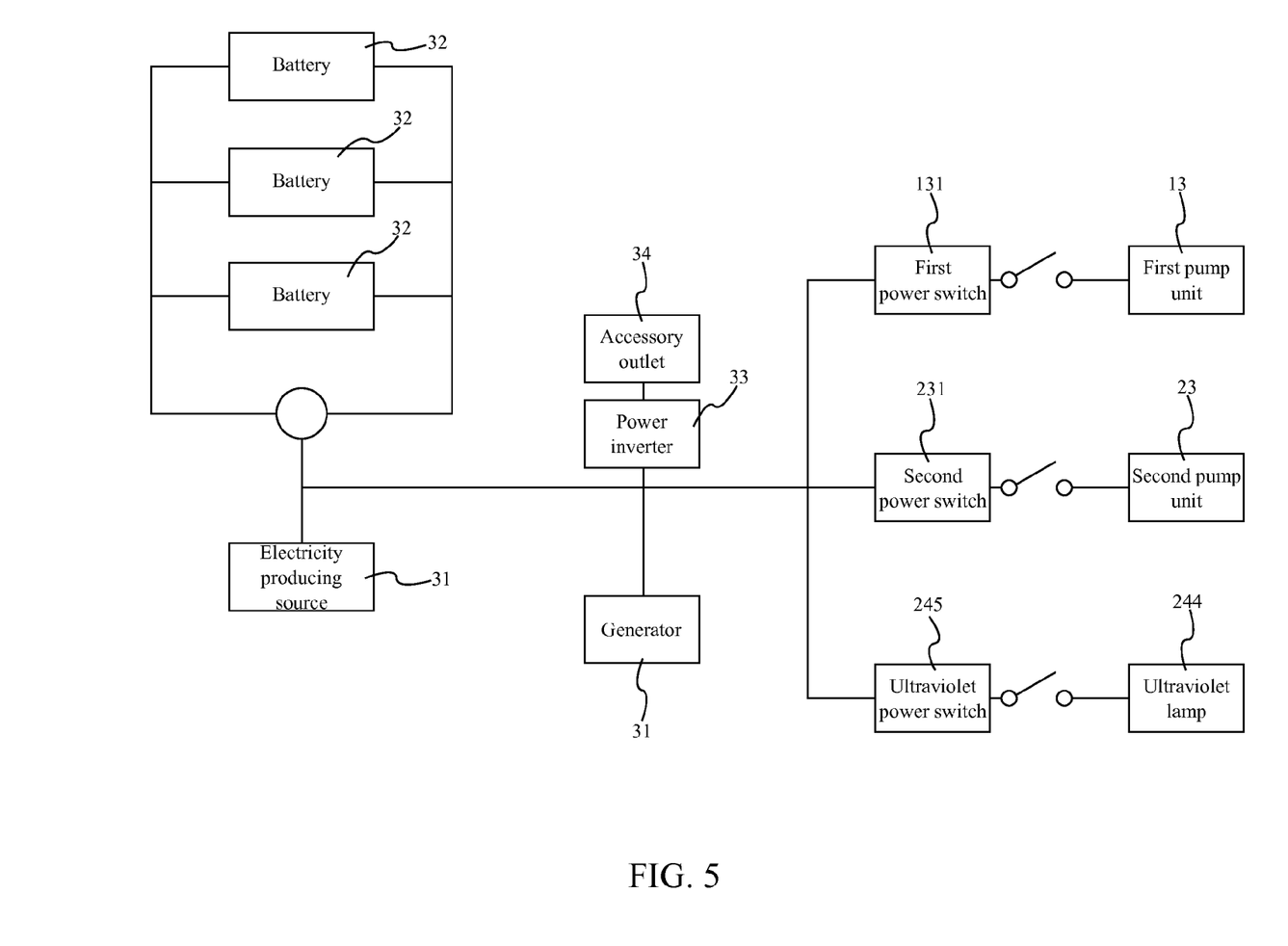
FIG. 5 is an electrical diagram for the present invention.
Figure 10:
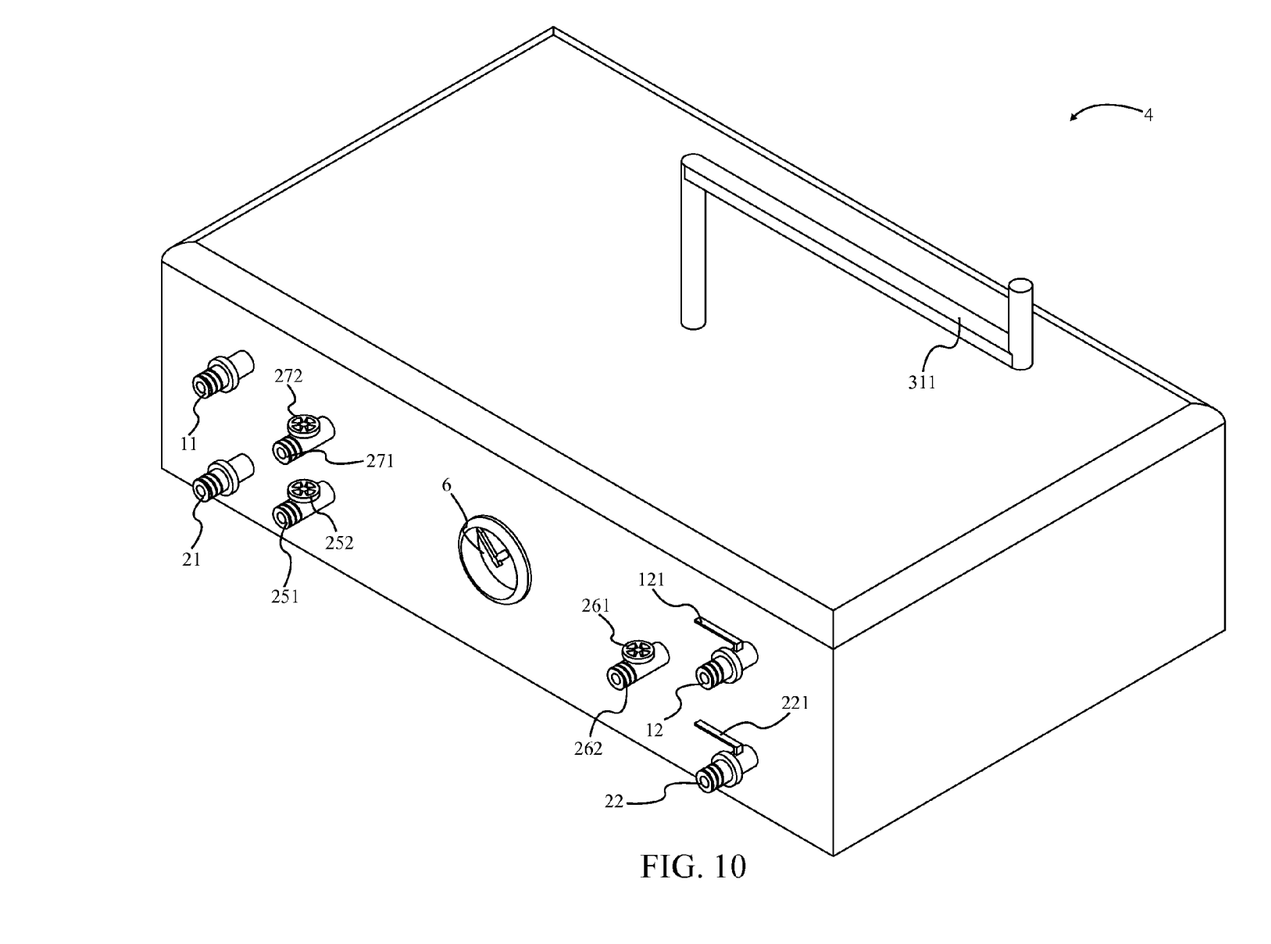
FIG. 10 is a front perspective view showing another example enclosure, including a hand crank for a generator, for the present invention.

As an auxiliary source of power, the power system 3 further comprises a generator 35, which itself comprises a hand crank 351. The generator 35, represented in FIG. 5, is housed within the enclosure 4 where it is electrically connected to the plurality of batteries 32. The hand crank 351, depicted in FIG. 10, is axially connected to the generator 35, and rotatably and externally mounted to the enclosure 4. This configuration allows a user to engage the generator 35 by rotating the hand crank 351, creating a current that is capable of charging the plurality of batteries 32. This allows for the batteries 32 to be charged (via human power) in conditions where the solar panel's 31 effectiveness is reduced due to suboptimal even inoperable environmental conditions. This further enhances the appeal of the present invention for use in remote areas or emergency situations where basic utilities, primarily power and water, are hard to come by.

Preferably, quick-connect receptacles are positioned on a top surface of the enclosure 4, allowing power sources to easily and quickly be switched out or added. Additionally, quick-connect receptacles are provided for internal components such as the batteries 32. These quick-connect receptacles introduce an element of modularity to the present invention. For example, the solar panel 31 can be removed to allow a human powered generator 35 to be installed. The solar panel 31 could also easily be upgraded by a user, who can simply purchase a solar panel 31 with a higher wattage to replace the original solar panel 31. This could also be used to allow a user to connect multiple solar panels 31, another way of increasing charge rate for the batteries 32 of the present invention. The quick-connect receptacles also allow for the installation, replacement, or upgrading of other components such as the aforementioned batteries 32. Overall, the quick-connect receptacles allow for easy servicing and upgrading of the present invention. Similarly, the enclosure 4 serves to secure and mount the various systems of the present invention, introducing a desired element of portability. Ultimately, the present invention can be utilized in any location where there exists a means to recharge the batteries 32, such as solar power and human power.

Similarly, the outlets of the present invention are designed to allow for easy connection and removal of plumbing fixtures. In the preferred embodiment this is shown through threading which allow hoses and pipes to be coupled through a threaded engagement, but in other embodiments alternative quick-connect methods can be provided. Electrical components are also easily connected and disconnected through the accessory outlets 34, represented by the type commonly (i.e. the 5-15 socket as classified by the National Electrical Manufacturers Association) used in North America as shown in the provided figures.

The present invention, as described above, is intended to address water sanitation, plumbing, and electricity generation in areas where these utilities are unavailable whether due to temporary circumstances, remote location, or a lack of the necessary infrastructure.

Although the invention has been explained in relation to its preferred embodiment, it is to be understood that many other possible modifications and variations can be made without departing from the spirit and scope of the invention as hereinafter claimed.

What is claimed is:

1. A portable power generation and pressurized water filtration unit comprises:
    an enclosure comprising a first pump system, a second pump system, and a power system;
    the first pump system consisting of a first pump inlet, a first pump outlet, and a first pump unit;
    the second pump system comprises a second pump inlet, a second pump outlet, a second pump unit, a filter system, a reverse osmosis treatment unit, and an alkaline treatment unit, wherein the second pump system is isolate from and without being in fluid communication with the first pump system;

the power system comprises an electrical generator and a plurality of batteries, said electrical generator and plurality of batteries fully enclosed within said enclosure, and at least one solar panel integrated into a surface of said enclosure;

the first pump inlet being in fluid communication with the first pump outlet through the first pump unit;

the second pump inlet being in serial fluid communication with the second pump outlet through the second pump unit and the filter system;

the first pump system and the second pump system each being electrically connected to the power system within the enclosure;

the alkaline treatment unit operative to produce alkaline enhanced water for human consumption at an outlet accessible on an exterior surface of the enclosure.

2. The portable power generation and pressurized water filtration unit as claimed in claim 1 comprises:
the first pump outlet comprises a first outlet valve;
the first outlet valve being variably connected to the first pump outlet, wherein the first outlet valve is actuated to fully and partially open and close the first pump outlet;
the second pump outlet comprises a second outlet valve;
the second outlet valve being connected with the second pump outlet, wherein the second outlet valve is actuated to fully and partially open and close the second pump outlet, wherein said first pump unit and said second pump unit increase the pressure of water passing through the enclosure to provide pressurized water at said first outlet valve and second outlet valve.

3. The portable power generation and pressurized water filtration unit as claimed in claim 1 comprises:
the first pump inlet, the second pump inlet, the first pump outlet, and the second pump outlet being externally mounted to the enclosure.

4. The portable power generation and pressurized water filtration unit as claimed in claim 1 comprises:
the first pump unit comprises a first power switch;
the second pump unit comprises a second power switch;
the first pump unit being electrically connected to the power system through the first power switch; and
the second pump unit being electrically connected to the power system through the second power switch.

5. The portable power generation and pressurized water filtration unit as claimed in claim 1 comprises:
the filter system comprises a micron filter, a carbon filter, and an ultraviolet treatment section;
the micron filter, the carbon filter, and the ultraviolet treatment section being sequentially positioned in a flow path between the second pump inlet and the second pump outlet; and
the filter system being housed within the enclosure.

6. The portable power generation and pressurized water filtration unit as claimed in claim 5 comprises:
the ultraviolet treatment section comprises an ultraviolet lamp;
the ultraviolet lamp comprises a ultraviolet power switch;
the ultraviolet lamp being centrally positioned within the ultraviolet treatment section; and
the ultraviolet lamp being electrically connected to the power system through the ultraviolet power switch.

7. The portable power generation and pressurized water filtration unit as claimed in claim 1 comprises:
the reverse osmosis treatment unit comprises a reverse osmosis outlet and a waste water outlet;
the reverse osmosis treatment unit being sequentially positioned after the filter system;
the reverse osmosis outlet being in fluid communication with the second pump inlet through the second pump unit; and
the waste water outlet being in fluid communication with the second pump inlet through the second pump unit.

8. The portable power generation and pressurized water filtration unit as claimed in claim 7 comprises:
the reverse osmosis outlet comprises an osmosis outlet valve;
the osmosis outlet valve being connected with the reverse osmosis outlet, wherein the osmosis outlet valve is actuated to fully and partially open and close the reverse osmosis outlet;
the waste water outlet comprises a waste outlet valve; and
the waste outlet valve being variably connected to the waste water outlet, wherein the waste outlet valve is actuated to fully and partially open and close the waste water outlet.

9. The portable power generation and pressurized water filtration unit as claimed in claim 1 comprises:
the alkaline treatment unit comprises an alkaline outlet and a waste water outlet;
the alkaline treatment unit being sequentially positioned after the fitter system;
the alkaline outlet being in fluid communication with the second pump inlet through the second pump unit; and
the waste water outlet being in fluid communication with the second pump inlet through the second pump unit.

10. The portable power generation and pressurized water filtration unit as claimed in claim 9 comprises:
the alkaline outlet comprises an alkaline outlet valve;
the alkaline outlet valve being connected with the alkaline outlet, wherein the alkaline outlet valve is actuated to fully and partially open and close the alkaline outlet;
the waste water outlet comprises a waste outlet valve; and
the waste outlet valve being variably connected to the waste water outlet, wherein the waste outlet valve is actuated to fully and partially open and close the waste water outlet.

11. The portable power generation and pressurized water filtration unit as claimed in claim 1 comprises:
at least one accessory outlet;
the at least one accessory outlet being externally positioned on the enclosure;
the plurality of batteries being housed within the enclosure; and
the plurality of batteries being electrically connected to the at least one accessory outlet.

12. The portable power generation and pressurized water filtration unit as claimed in claim 11 comprises:
a power inverter being electrically connected between the plurality of batteries and the at least one accessory outlet.

13. The portable power generation and pressurized water filtration unit as claimed in claim 1 comprises:
each of the plurality of batteries being electrically connected to each other in parallel.

14. The portable power generation and pressurized water filtration unit as claimed in claim 1 comprises:
the electricity producing source being an at least one solar panel;
the at least one solar panel being externally mounted to the enclosure; and
the at least one solar panel being electrically connected to the plurality of batteries.

15. The portable power generation and pressurized water filtration unit as claimed in claim 1 comprises:
the power system further comprising a second electrical generator;
the second electrical generator comprises a hand crank;
the hand crank being axially connected to the second electrical generator;
the second electrical generator being housed within the enclosure;
the hand crank being rotatably and externally mounted to the enclosure; and
the second electrical generator being electrically connected to the plurality of batteries.

16. The portable power generation and pressurized water filtration unit as claimed in claim 1 comprises:
a pressure gauge;
the pressure gauge being externally mounted to the enclosure; and
the pressure gauge being in parallel fluid communication with the second pump system.

* * * * *